US010536981B2

(12) United States Patent
Novlan et al.

(10) Patent No.: US 10,536,981 B2
(45) Date of Patent: Jan. 14, 2020

(54) LONG-TERM EVOLUTION ASSISTED NEW RADIO INITIAL ACCESS AND MOBILITY FOR 5G OR OTHER NEXT GENERATION NETWORKS

(71) Applicant: AT&T Intellectual Property I, L.P., Atlanta, GA (US)

(72) Inventors: Thomas Novlan, Austin, TX (US); Salam Akoum, Austin, TX (US); Arunabha Ghosh, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

(21) Appl. No.: 15/399,547

(22) Filed: Jan. 5, 2017

(65) Prior Publication Data
US 2018/0192412 A1    Jul. 5, 2018

(51) Int. Cl.
*H04W 72/04* (2009.01)
*H04W 56/00* (2009.01)
(Continued)

(52) U.S. Cl.
CPC .......... *H04W 76/10* (2018.02); *H04L 5/0048* (2013.01); *H04W 56/006* (2013.01)

(58) Field of Classification Search
None
See application file for complete search history.

(56) References Cited

U.S. PATENT DOCUMENTS 9,736,875 B2 * 8/2017 Wietfeldt ............... H04B 15/00
2007/0291713 A1 * 12/2007 Machida ............... H04W 48/10
370/338
(Continued)

FOREIGN PATENT DOCUMENTS

WO    2016117981 A1    7/2016
WO    2016130175 A1    8/2016
(Continued)

OTHER PUBLICATIONS

Giordani et al., "Initial Access in 5G mm-Wave Cellular Networks," arXiv preprint arXiv:1602.07731, 2016, 8 pages.
(Continued)

*Primary Examiner* — Steve R Young
(74) *Attorney, Agent, or Firm* — Amin, Turocy & Watson, LLP

(57) ABSTRACT

Long-term evolution assisted new radio initial access and mobility for 5G or other next generation networks are provided herein. A method can include transmitting, by a first network device of a wireless network and comprising a processor, a first timing synchronization signal and first acquisition information of the first network device to a mobile device. In response to the transmitting and based on a transmission received from the mobile device, a connection between the mobile device and a radio resource control of the wireless network can be facilitated. In addition, in response to the mobile device determining the location of the second timing synchronization signal based on the data indicative of the location of the second timing synchronization signal, the second network device can transmit, to the mobile device, the second timing synchronization signal and second acquisition information of the second network device.

20 Claims, 15 Drawing Sheets

(51) Int. Cl.
*H04L 5/00* (2006.01)
*H04W 76/10* (2018.01)

(56) References Cited

U.S. PATENT DOCUMENTS

| | | | |
|---|---|---|---|
| 2014/0321375 A1* | 10/2014 | Agiwal | H04W 56/001 |
| | | | 370/329 |
| 2015/0016239 A1* | 1/2015 | Yi | H04J 11/003 |
| | | | 370/201 |
| 2015/0257012 A1 | 9/2015 | Zhang | |
| 2016/0157195 A1* | 6/2016 | Wang | H04W 56/001 |
| | | | 370/350 |
| 2016/0360439 A1 | 12/2016 | Phan et al. | |
| 2017/0019819 A1* | 1/2017 | Yang | H04B 7/1855 |
| 2018/0098293 A1* | 4/2018 | Jiang | H04L 27/2617 |
| 2018/0109344 A1* | 4/2018 | Ly | H04J 11/00 |

FOREIGN PATENT DOCUMENTS

| | | |
|---|---|---|
| WO | 2016171731 A1 | 10/2016 |
| WO | 2016186699 A1 | 11/2016 |
| WO | 2016195640 A1 | 12/2016 |
| WO | 2016195735 A1 | 12/2016 |

OTHER PUBLICATIONS

Nakamura et al., "5G Radio Access: Requirements, Concept and Experimental Trials," IEICE Transactions on Communications, Aug. 2015, pp. 1397-1406, vol. E98-B, No. 8, 10 pages.

\* cited by examiner

LONG-TERM EVOLUTION ASSISTED NEW RADIO INITIAL ACCESS AND MOBILITY FOR 5G OR OTHER NEXT GENERATION NETWORKS

TECHNICAL FIELD

This disclosure relates generally to facilitating assisted initial access and mobility for new radios. For example, this disclosure relates to facilitating assisted initial access and mobility for a new radio or a 5G, or other next generation network, air interface.

BACKGROUND

As communication networks evolve, new demands are being placed on the networks, including an expectation of fast access and uninterrupted services. A next phase of mobile telecommunications standards is referred to as 5th generation (5G). The 5G wireless systems attempt to provide higher capacity than existing standards (e.g., 4th generation (4G)). The higher capacity can allow a higher number of mobile broadband users per area unit. Further, these mobile broadband users can be provided, and can consume, a higher or unlimited data quantity. Thus, a large percentage of the population can be provided the capability to stream, for hours at a time, high-definition media through their mobile devices, even though out of range of wireless fidelity hot spots. Further, to keep up with demand, 5G wireless systems should improve support and reduce throughput time for machine-to-machine communication, referred to as the Internet-of-Things (IoT), while lowering costs and decreasing battery consumption.

BRIEF DESCRIPTION OF THE DRAWINGS

Various non-limiting embodiments are further described with reference to the accompanying drawings in which.

DETAILED DESCRIPTION

Figure 1:
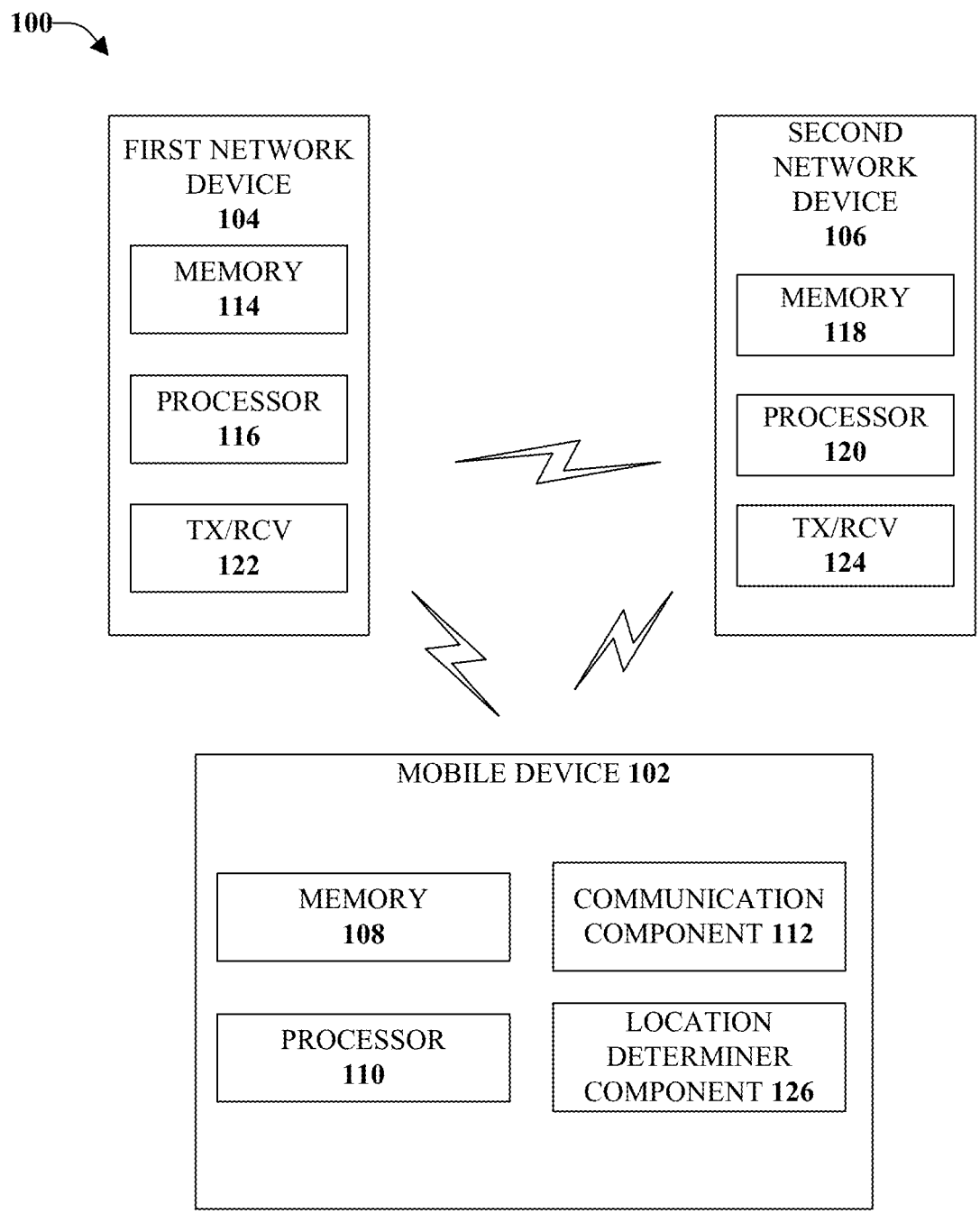
FIG. 1 illustrates an example, non-limiting communications system for providing signaling for efficient initial access and mobility in accordance with one or more embodiments described herein.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The various aspects described herein relate to new radio, which can be deployed as a standalone radio access technology or as a non-standalone radio access technology assisted by another radio access technology, such as Long Term Evolution (LTE), for example. LTE specifies a fixed location of the signals used for initial access, such as Primary Synchronization Signals (PSS), Secondary Synchronization Signals (SSS), and physical broadcast channels (PBCH). LTE also specifies a fixed location of wideband mobility measurement signals, which are cell-specific (e.g., Cell specific Reference Signals (CRS)). New radio (NR) does not employ a fixed position for signals used for initial access and wideband mobility measurement. For new radio, the various aspects discussed herein provide flexibility and/or configurability of the synchronization signals and broadcast channels used for initial access. As discussed herein, the configuration and indication of the time resources and/or frequency resources used for initial access on new radio can be provided by implicit or explicit LTE signaling to reduce mobile device complexity and provide for efficient initial access and mobility.

As an overview, various embodiments are described herein to facilitate initial access and mobility for a 5G network or other next generation networks It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate initial access and mobility for a 5G network. Facilitating initial access and mobility for a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is connected to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously to tens of workers on the same office floor, several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

In one embodiment, described herein is a method that can include transmitting, by a first network device of a wireless network and comprising a processor, a first timing synchronization signal and first acquisition information of the first network device to a mobile device. The first acquisition information can comprise data indicative of a location of a second timing synchronization signal of a second network device of the wireless network. The method can also include in response to the transmitting of the first timing synchronization signal and the first acquisition information and based on a transmission received from the mobile device, facilitating, by the first network device, a connection between the mobile device and a radio resource control of the wireless network. In addition, the method can include in response to the mobile device determining the location of the second timing synchronization signal based on the data indicative of the location of the second timing synchronization signal, instructing the second network device to transmit, to the mobile device, the second timing synchronization signal and second acquisition information of the second network device. The first network device can be associated with a first radio access technology and the second network device can be associated with a second radio access technology different from the first radio access technology.

According to another embodiment, a system can include a processor and a memory that stores executable instructions that, when executed by the processor, facilitate performance of operations. The operations can include transmitting a first signal to a mobile device via a network device of a group of network devices of a wireless network. The first signal can include a first timing synchronization of the network device. The operations can also include transmitting a second signal to the mobile device via the network device. The second signal can include system information of the network device. Further, the second signal can include an indication of a location of synchronization signals of a radio device of the wireless network. Further, the operations can include facilitating establishing a radio resource control connection between the mobile device and the network device in response to transmitting the first signal and transmitting the second signal. The operations can also include transmitting a third signal to the mobile device via the radio device based on a determination that the mobile device is monitoring the synchronization signals of the radio device. The third signal can include a second timing synchronization of the radio device. Further, the operations can include transmitting a fourth signal to the mobile device via the radio device. The fourth signal can include radio device system information for the radio device.

According to yet another embodiment, described herein is a machine-readable storage medium comprising executable instructions that, when executed by a processor, facilitate performance of operations. The operations can include sending a first signal to a mobile device via a network device of network devices of a wireless network. The first signal can include first timing synchronization information of the network device. The operations can also include sending a second signal to the mobile device via the network device. The second signal can include an instruction related to a location of synchronization signals of a radio device. Further, the operations can include facilitating establishing a radio resource control connection between the mobile device and the network device in response to the transmitting the first signal and the transmitting the second signal. The operations can also include transmitting a third signal to the mobile device via the radio device based on a determination that the mobile device is monitoring the synchronization signals of the radio device. The third signal can include a second timing synchronization of the radio device. Further, the operations can include transmitting a fourth signal to the mobile device via the radio device. The fourth signal can include radio device system information for the radio device.

Referring initially to FIG. 1 illustrated is an example, non-limiting communications system 100 for providing signaling for efficient initial access and mobility in accordance with one or more embodiments described herein. The various aspects provided herein can provide initial access and synchronization for new radio. For example, while a mobile device is in connected mode, an implicit or explicit "pointer" can be used to point the mobile device to the location(s) of the synchronization signals the mobile device should monitor. The implicit or explicit "pointer" can be provided in higher layer signaling (e.g., System Information Block (SIB) signaling and/or Radio Resource Control (RRC) signaling), for example. When the mobile device is in connected or idle mode, a prioritized pattern of a subset of possible synchronization signal locations can be provided to mitigate blind search complexity. Further, for a hybrid mode, for example, the mobile device may maintain a very lightweight connection to LTE (e.g., RRC_CONNECTED with long discontinuous reception (DRX)) to obtain assistance information for NR IDLE mode search. Further, LTE configured/trigger NR measurements can be reported on either LTE or NR carriers.

The wireless communications system 100 can include a mobile device 102, a first network device 104, and a second network device 106. The first network device 104 and the second network device 106 can be included in a group of network devices of a wireless network. The first network device 104 can be associated with a first radio access technology and the second network device 106 can be associated with a second radio access technology. In accordance with an implementation, the first radio access technology can be LTE and the second radio access technology can be New Radio (NR). For example, the wireless communications system 100 can support a standalone NR deployment and/or a non-standalone NR deployment. In the case of non-standalone NR deployment, the wireless communications system 100 can support dual-connectivity, wherein control signaling can be performed over LTE, while the data signaling can be performed over NR. In the case of a standalone NR, a seamless integration can be applied, wherein the devices function through NR.

It is noted that although the various aspects are discussed with respect to LTE and NR, the disclosed aspects are not limited to this implementation and other radio access technologies can be utilized with the disclosed aspects. Further, although only a single mobile device and two network devices are shown and described, the various aspects are not limited to this implementation. Instead, multiple mobile devices may be included in a communications network. Further, more than two network devices may be included in the communications network.

NR can be deployed as a standalone (SA) radio access technology or as a non-standalone (NSA) radio access technology assisted by another radio access technology. For example, LTE is widely deployed and can provide seamless coverage and uninterrupted connectivity. However, NR can provide (at times significantly) increased data rates or new services. However, the deployment of NR can be limited and within hotspots under the footprint of LTE. Scenarios for non-standalone NR deployments include homogenous deployments (e.g., macro only, pico only) and heterogeneous deployments (e.g., macro and pico). FIGS. 2-5 illustrate the various NR deployments that can be utilized with the disclosed aspects.

Figure 2:
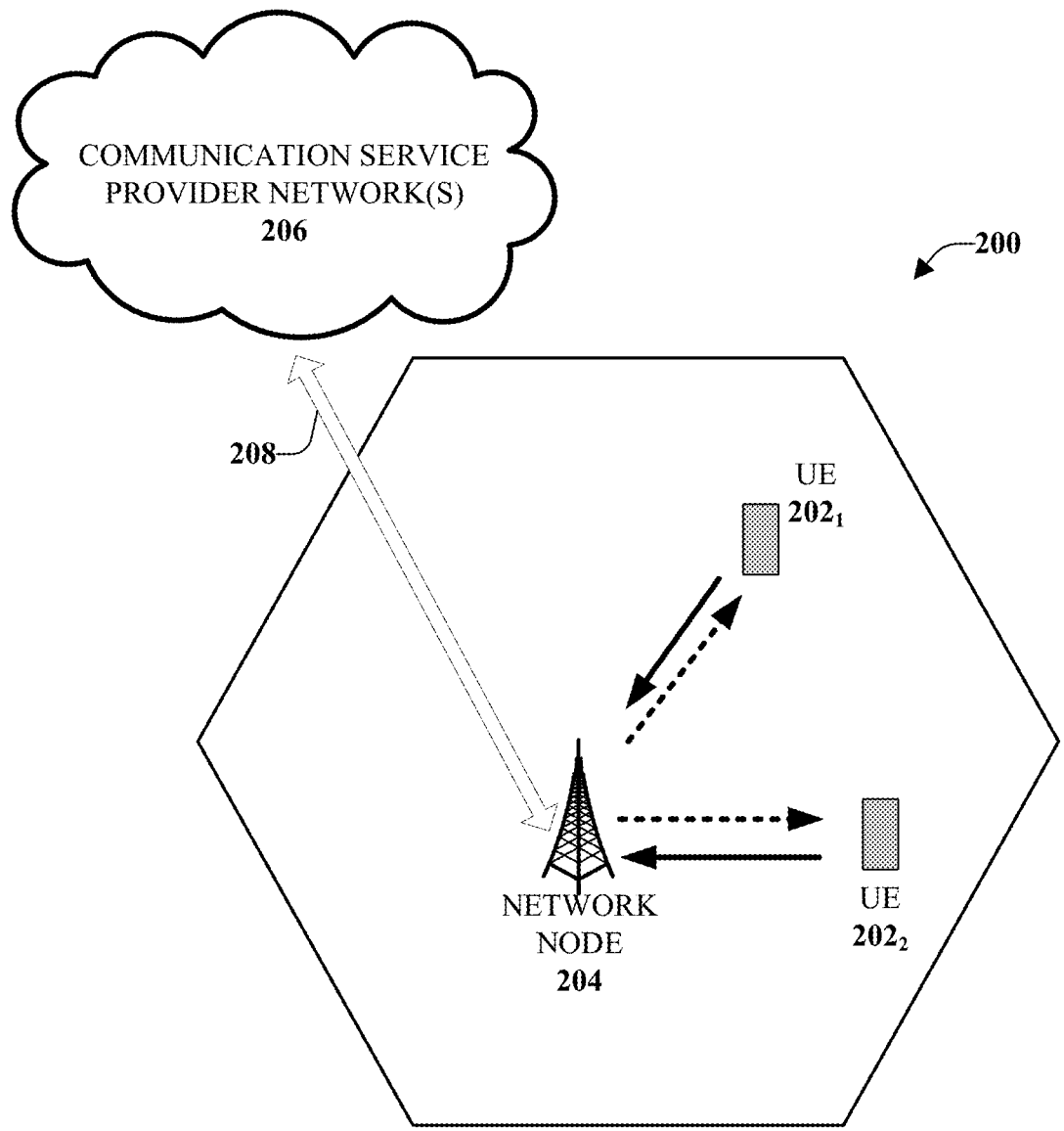
FIG. 2 illustrates an example, non-limiting wireless communication system in accordance with one or more embodiments described herein.

FIG. 2 illustrates an example, non-limiting wireless communication system 200 in accordance with one or more embodiments described herein. The system 200 can include a wireless communication network serviced by one or more wireless communication network providers. According to an example, the system 200 can include one or more mobile devices or user equipments or UEs 202, illustrated as UE $202_1$, UE $202_2$, through UE $202_N$, where N is an integer. The UEs 202 can include one more antenna panels that can comprise vertical elements and/or horizontal elements.

As used herein, a UE can be a user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. A UE can also comprise IoT devices that can communicate wirelessly. The UE roughly corresponds to the mobile station (MS) in global system for mobile communications (GSM) systems. Thus, a network node 204 (e.g., network node device) can provide connectivity between the UEs and a wider cellular network and can facilitate wireless communication between the UEs and the wireless communication network (e.g., one or more communication service provider networks 206) through the network node 204. The UEs 202 can send and/or receive communication data wirelessly to/from the network node 204. The dashed arrow lines from the network node 204 to the UEs 202 represent downlink (DL) communications and the solid arrow lines from the UEs 202 to the network nodes 204 represent uplink (UL) communications.

The term network node (e.g., network node device) is used herein to refer to any type of network node serving a UE and/or connected to other network nodes, network elements, or another network node from which the UEs can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 204) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

With continuing reference to FIG. 2, the system 200 can include one or more communication service provider networks 206 that facilitate providing wireless communication services to various UEs, including UEs 202, via the network node 204 and/or various additional network devices (not shown) included in the one or more communication service provider networks 206. The one or more communication service provider networks 206 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, the system 200 can be or can comprise a large scale wireless communication network that spans various geographic areas. According to this implementation, the one or more communication service provider networks 206 can be or can comprise the wireless communication network and/or various additional devices and components of the wireless communication network (e.g., additional network devices and cells, additional UEs, network server devices, etc.).

The network node 204 can be connected to the one or more communication service provider networks 206 via one or more backhaul links 208. For example, the one or more backhaul links 208 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 208 can also include wireless link components, such as but not limited to, line-of-sight (LOS) or non-LOS links which can include terrestrial air-interfaces or deep space links (e.g., satellite communication links for navigation).

Figure 3:
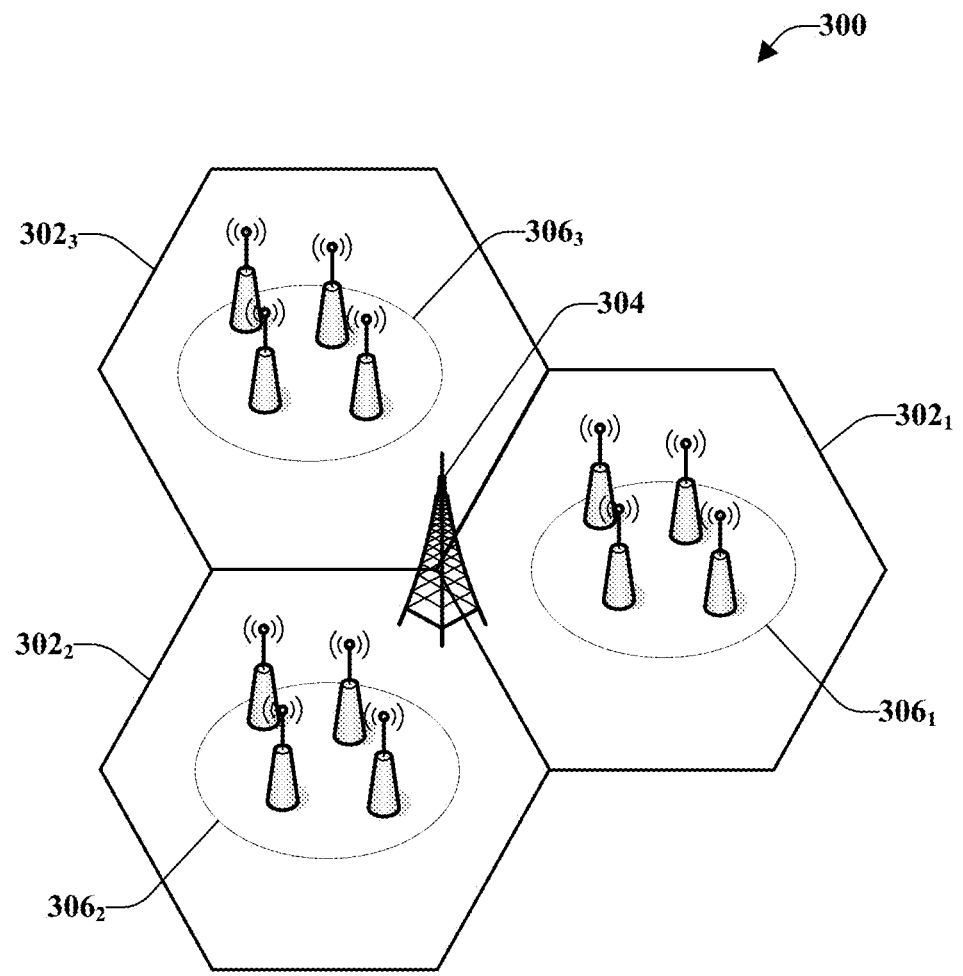
FIG. 3 illustrates an example, non-limiting block diagram representation of a deployment scenario for a heterogeneous network for a non-standalone new radio deployment in accordance with one or more embodiments described herein.

FIG. 3 illustrates an example, non-limiting block diagram representation of a deployment scenario for a heterogeneous network 300 for a non-standalone new radio deployment in accordance with one or more embodiments described herein. The deployment scenario can include an LTE on a macro infrastructure and a NR on a pico infrastructure. For example, a three sector wireless communications network is illustrated as three sectors, namely, a first sector $302_1$, a second sector $302_2$, and a third sector $302_3$. LTE 304 can be deployed as large coverage (or macro coverage) on the first sector $302_1$, the second sector $302_2$, and the third sector $302_3$.

Further, for heavy mobility network traffic situations, NR can be deployed on smaller sites. In such a manner, wide area coverage can be provided via NR hot spots. For example, illustrated in the first sector $302_1$ is a first NR hot spot $306_1$, in the second sector $302_2$ can be a second NR hot spot $306_2$, and in the third sector $302_3$ can be a third NR hot spot $306_3$. It is noted that although only three sectors, each having a single NR hot spot are shown and described, the disclosed aspects can be utilized with more than three sectors and/or more than one NR hot spot in each sector. Further, the network is referred to as a heterogeneous network 300 because both a macro infrastructure and a pico infrastructure are included in the network.

Figure 4:
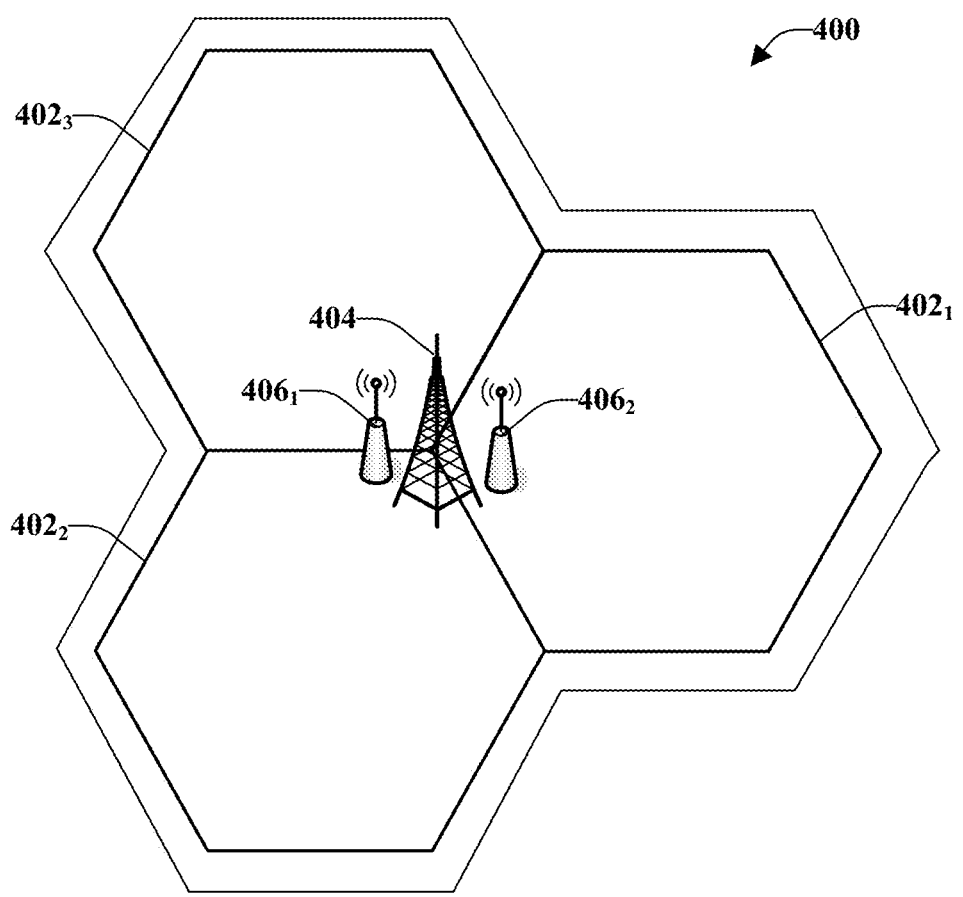
FIG. 4 illustrates another example, non-limiting block diagram representation of a deployment scenario for a homogeneous network for a non-standalone new radio deployment in accordance with one or more embodiments described herein.

FIG. 4 illustrates another example, non-limiting block diagram representation of a deployment scenario for a homogeneous network 400 for a non-standalone new radio deployment in accordance with one or more embodiments described herein. The deployment scenario can include LTE on a macro infrastructure and NR on macro infrastructure. Similar to the above figure, FIG. 4 illustrates a three sector wireless communications network, namely, a first sector $402_1$, a second sector $402_2$, and a third sector $402_3$. LTE 404 can be deployed as large coverage (or macro coverage) on the first sector $402_1$, the second sector $402_2$, and the third sector $402_3$. Further, NR $406_1$, $406_2$ can be deployed on the macro network (e.g., on the first sector $402_1$, the second sector $402_2$, and the third sector $402_3$). It is noted that although only three sectors are illustrated, the homogeneous network 400 can include more than three sectors.

Deploying both LTE 404 and NR $406_1$, $406_2$ on the macro network can be useful for facilitating different frequency bands. Further, since NR $406_1$, $406_2$ can provide new services for mobile devices, additional network efficiencies can be realized by deploying both LTE 404 and NR $406_1$, $406_2$ on the macro network. Further, the network is referred to as a homogeneous network 400 because both LTE and NR are deployed on a macro network.

Figure 5:
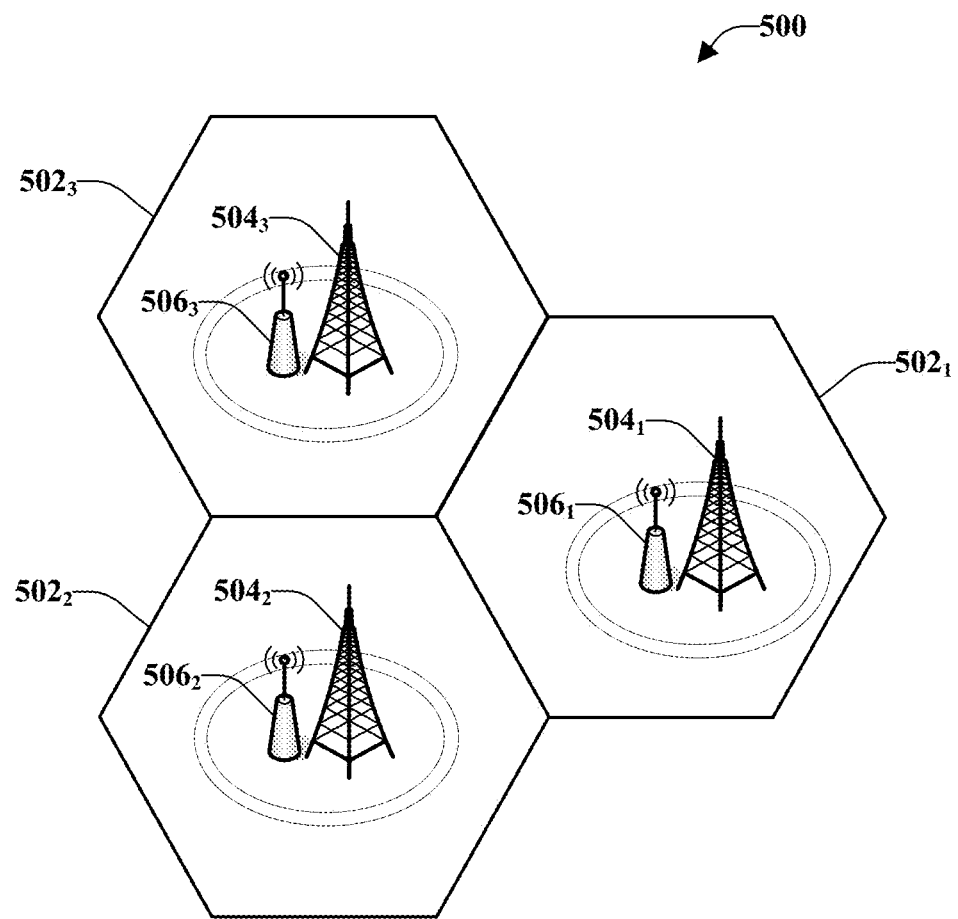
FIG. 5 illustrates another example, non-limiting block diagram representation of a deployment scenario for another homogeneous network for a non-standalone new radio deployment in accordance with one or more embodiments described herein.

FIG. 5 illustrates another example, non-limiting block diagram representation of a deployment scenario for another homogeneous network 500 for a non-standalone new radio deployment in accordance with one or more embodiments described herein. The deployment scenario can include LTE on a pico infrastructure and NR on a pico infrastructure. Similar to the above figures, illustrated is a three sector wireless communications network, namely, a first sector $502_1$, a second sector $502_2$, and a third sector $502_3$. It is noted that although only three sectors are illustrated, the homogeneous network 500 can include more than three sectors.

As illustrated, LTE $504_1$ and NR $506_1$ can be deployed in the first sector $502_1$; LTE $504_2$ and NR $506_2$ can be deployed in the second sector $502_2$; and LTE $504_3$ and NR $506_3$ can be deployed in the third sector $502_3$. Deploying both LTE and NR within the pico infrastructure can be useful for dense hot spots and/or for indoor deployment where LTE $504_1$, $504_2$, $504_3$ can provide a control plane, while NR $506_1$, $506_2$, $506_3$ provides data service. Further, the network is referred to as a homogeneous network 500 because both LTE and NR are deployed on a pico network.

Figure 6:
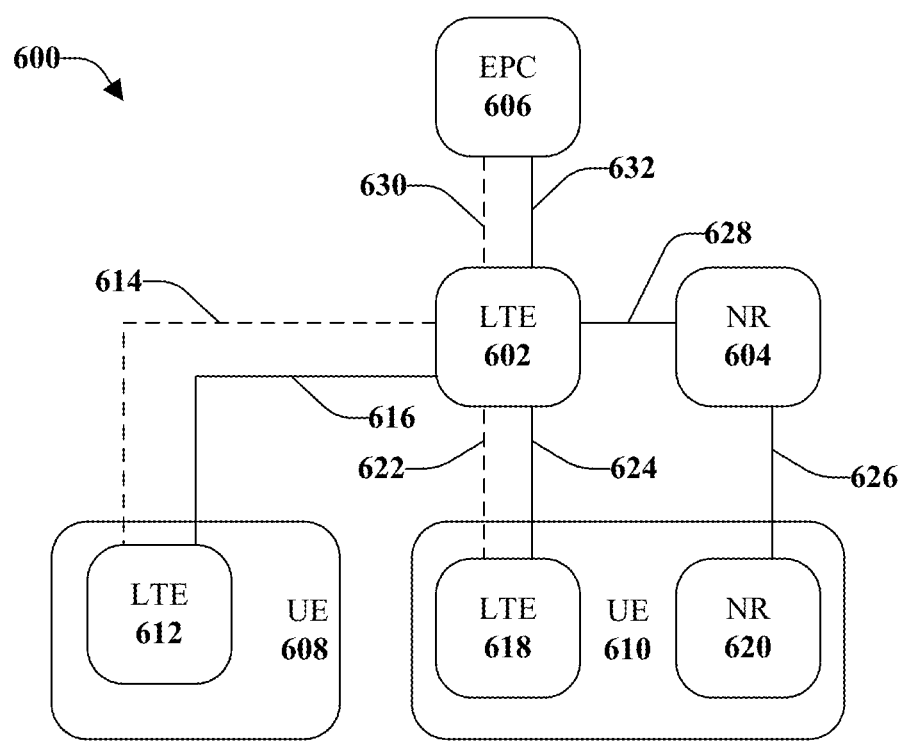
FIG. 6 illustrates an example, non-limiting schematic block diagram of a system for a non-standalone new radio in accordance with one or more embodiments described herein.

FIG. 6 illustrates an example, non-limiting schematic block diagram of a system 600 for a non-standalone new radio in accordance with one or more embodiments described herein. According to various implementations, different mechanisms for supporting a NR deployment using another radio access technology (RAT), such as LTE for example, can be supported. Such support can include dual connectivity, carrier aggregation, or tight-interworking, for example.

The system 600 can include an LTE device 602 and an NR device 604. Also included in the system 600 can be an evolved core packet or EPC 606. The EPC 606 can be the core network that the LTE device 602 connects to in order to obtain authentication and internet access. The system can also include user equipment (UE), such as first UE 608 and second UE 610.

As illustrated, the first UE 608 can comprise an LTE radio 612, which can allow communication with the LTE device 602 through an LTE compliant protocol. For example, the LTE compliant protocol can be a SI C-Plane 614 (denoted by the dashed line between the LTE radio 612 and the LTE device 602) and a SI U-Plane 616 (denoted by the solid line between the LTE radio 612 and the LTE device 602). The SI C-Plane 614 can be a sensor control plane and the SI U-Plane 616 can be a data plane. Accordingly, the first UE 608 can communicate with the EPC 606. In some implementations, the first UE 608 can be a legacy UE.

In an alternative implementation, the second UE 610 can include an LTE radio 618 and a NR radio 620. The LTE radio 616 can facilitate communicate with the LTE device 602 through an LTE compliant protocol, such as a SI C-Plane 622 (denoted by the dashed line between the LTE radio 618 and the LTE device 602) and a SI U-Plane 624 (denoted by the solid line between the LTE radio 617 and the LTE device 602). The SI C-Plane 622 can be the sensor control plane and the SI U-Plane 624 can be the data plane. Further, the second UE 610 can communicate with the NR device 604 using the NR radio 622 over a NR data plane 626, which can be a NG1-U (NG2) plane (or an NG1-U (WG3) plane). Further, the NR device 604 can communicate with the LTE device 602 over a NR data plane, which can be a NG1-U (NG2) plane or an NG1-U (WG3) plane, as denoted by line 628. Further, the LTE device 602 can communicate with the EPC through an LTE compliant protocol. For example, the LTE compliant protocol can be a SI C-Plane 630 (denoted by the dashed line between the LTE device 602 and the EPC 606) and a SI U-Plane 632 (denoted by the solid line between the LTE device 602 and the EPC 606).

As illustrated, the first UE 608 (e.g., the legacy UE) can only communicate through LTE since the first UE 608 includes only an LTE radio 612. However, the second UE 610 can communicate through LTE and/or through NR since the second UE 610 includes both an LTE radio 618 and an NR radio 620. Accordingly, the second UE 610 comprises dual connectivity between NR and LTE. Further, there can be bearer aggregation in a random access network (RAN).

It is noted that FIG. 6 illustrates a situation with single connectivity between the NR device 604 and the NR radio 620 where control plane function are sent via LTE (e.g., between the LTE radio 618 and the LTE device 602). However, the disclosed aspects are not limited to this implementation. Instead, control plane functions can be sent through NR (e.g., between the NR radio 620 and the NR device 604).

With continuing reference to FIG. 1, the mobile device 102 can include a memory 108 operatively connected to a processor 110. The memory 108 can store protocols associated with new radio initial access and mobility as discussed herein. Further, the memory 108 can facilitate action to control communication between the mobile device 102, the first network device 104, and/or the second network device 106, such that the wireless communications system 100 can employ stored protocols and/or algorithms to achieve improved communications in a wireless network as described herein.

The mobile device 102 can also include a communication component 112. For example, the communication component 112 can be a transmitter/receiver configured to transmit and/or receive data from the first network device 104, the second network device 106, other network devices, and/or other mobile devices. Through the communication component 112, the mobile device 102 can concurrently transmit and receive data, the mobile device 102 can transmit and receive data at different times, or combinations thereof.

Further, the first network device 104 can include a memory 114 operatively connected to a processor 116 and the second network device 106 can include a memory 118 operatively connected to a processor 120. In addition, the first network device 104 and the second network device 106 can include respective transmitter/receivers 122, 124. The respective transmitter/receivers 122,124 can facilitate communication between each other, the mobile device 102, other network devices, and/or other mobile devices.

In an example, the communication component 112 can receive from the first network device 104 (e.g., the transmitter/receiver 122) a first timing synchronization signal and first acquisition information. The first acquisition information can comprise data indicative of a location of a second timing synchronization signal of the second network device 106. For example, LTE provides a fixed time and frequency location of its synchronization signals and, therefore, the mobile device 102 is aware of the location. However, NR can cover a diverse set of deployment scenarios that can move the synchronization signals in time and frequency among different locations. When NR is coexisting on LTE, the LTE locations, which cannot be moved, should be avoided. The various aspects discussed herein provide for avoidance of the LTE locations while, at substantially the same time, determining the NR locations.

Figure 7:
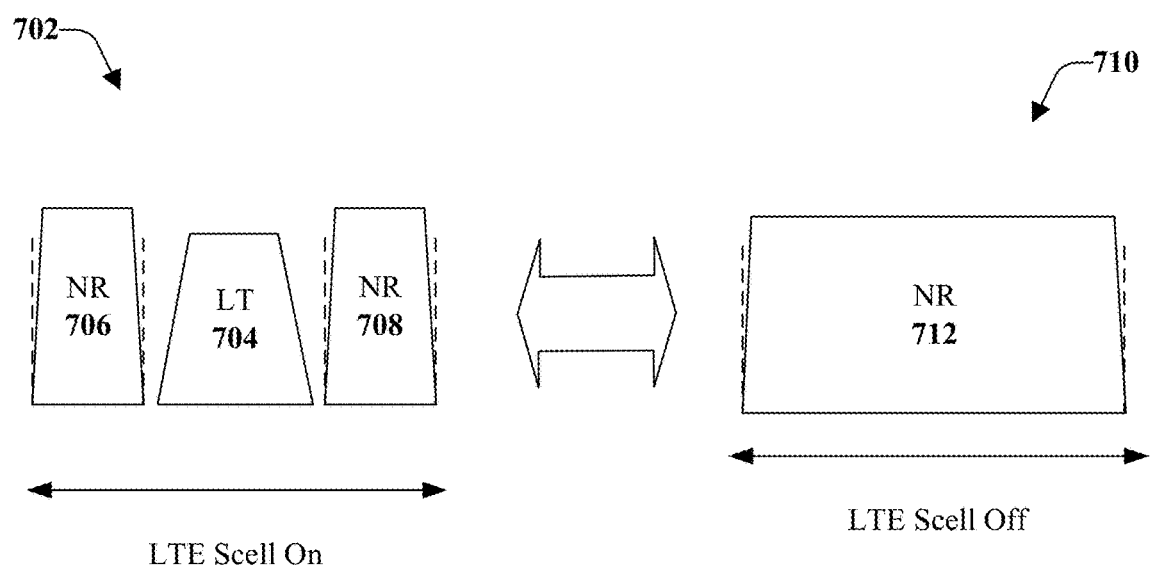
FIG. 7 illustrates an example, non-limiting new radio synchronization signal design for when a radio access technology used for new radio assistance is activated and when the radio access technology is deactivated in accordance with one or more embodiments described herein.

FIG. 7 illustrates an example, non-limiting new radio synchronization signal design for when a radio access technology used for new radio assistance is activated and when the radio access technology is deactivated in accordance with one or more embodiments described herein. In an example, the radio access technology used for new radio assistance can be LTE.

LTE specifies a fixed location of the signals used for initial access and wideband mobility measurement reference signals, which are cell-specific (CRS). When the LTE is active (e.g., LTE SCell On), as indicated at 702, the fixed location is illustrated by location 704. The signals used for initial access can include PSS/SSS/PBCH. However, for NR is can be beneficial to provide flexibility/configurability of the synchronization signals and broadcast channels used for initial access.

A use case for providing the flexibility can be in the case of LTE and NR coexisting on the same frequency band. When LTE is active (as a SCell), illustrated at 702, the LTE PSS/SSS/CRS are transmitted in the center Physical Resource Blocks (PRBs). For example, the LTE PSS/SSS/CRS can be transmitted in the center six PRBs with a periodicity of 5 ms (for some UEs) or 160 ms (for other UEs). The center PRBs should be avoided by NR transmission 706, 708 to prevent collisions and potential performance impact on legacy LTE UEs (e.g., first UE 608 of FIG. 6). When the LTE SCell is off, as illustrated at 710, the NR transmission 712 can occupy the entire frequency band.

It is noted that the various aspects discussed herein can facilitate LTE-assisted initial access, which can also support the operation of Integrated Access and Backhaul (IAB) for NR. In order to allow quick deployment of NR cells, some transmission points can support relaying functionality, which can be operated as a multi-hop, multi-connectivity backhaul network. In order to support the discovery, connection establishment, synchronization, and connection management, backhaul nodes can utilize procedures similar to UEs for performing initial access and mobility. However, the backhaul nodes should use independent parameter configurations for access/backhaul taking into account topology-based (e.g., hop-order) half-duplex constraints.

For example, a backhaul node can perform initial access, resource configuration, and connection management for IAB by utilizing LTE-assistance signaling for configuration of the NR initial access and radio resource management (RRM) parameters specific for backhaul operation in addition to other parameters which can be utilized by backhaul nodes for resource coordination based on hop order or traffic load (e.g., Time Division Duplex (TDD) configuration per hop order, reserved/flexible resource indication, or topology related (e.g., hop order). In addition IAB nodes can directly utilize LTE for performing control plane transmissions (e.g., initial access and connection establishment) while data plane transmissions can be performed on NR. This can be beneficial because backhaul nodes utilizing LTE on another carrier would not be subject to the same half-duplex constraints which could be present on the NR carrier.

Thus, the various aspects provided herein can facilitate determining the location of the NR signals, which can be facilitated by using LTE assisted signaling. The LTE assisted signaling can take into account whether the initial access and NR parameters are for backhaul and can signal them to the nodes. The LTE assisted signaling can also allow the backhaul nodes to directly connect to LTE to provide initial configuration and then transition the data transitions over NR.

With reference again to FIG. 1, the transmitter/receiver 122 can provide, to the mobile device 102, location information related to the signals for the second network device 106. Based on this information, a location determiner component 126 of the mobile device 102 can perform one or more searches to discover the location of the NR signals. The search can include a center-to-edge search, a bandwidth plus increment search, or another type of search.

According to an implementation, time/frequency configuration of NR synchronization signals/channels can be provided. The level of flexibility and configurability (e.g., network, cell, or UE-specific) can depend on the use case. Further, the flexibility and configurability should support LTE-NR coexistence use case (e.g., NR synchronization signals/channels are located at least outside of center 6 PRBs of LTE carrier). In the case of standalone NR deployment, a large number of possible locations for the signals may cause unacceptable complexity at the UE which can perform blind decoding, and a subset of possible locations can be predefined (per frequency band or based on carrier bandwidth). However if assistance information can be provided in the case of non-standalone NR deployment, UE complexity is not a large concern and the number of positions could be left open for forward compatibility. In addition the configuration on the NR initial access signals can be statically configured or fixed for a given NR carrier (e.g., outside of LTE center bandwidth (e.g., 6 PRBs). Alternatively, the configuration on the NR initial access signals can include the indication to switch between multiple configured locations (e.g., center and edge of NR bandwidth) based on a trigger (e.g., whether the LTE SCell is On or OFF).

As mentioned, the first network device 104 can provide assistance information for NR initial access. For example, the mobile device 102 can be provided data indicative of the location of the NR signals in time or frequency, or both time and frequency. In an example, the data indicative of the location of the second timing synchronization signal can comprise another location of a center frequency of the second network device 106 and an offset value. The offset value can be based on a bandwidth configuration for the second timing synchronization signal.

According to some implementations, the transmitter/receiver 122 can transmit an explicit signal to the mobile device 102. The explicit signal can comprises the data indicative of the location of the second timing synchronization signal and can be included in the first acquisition information. The explicit signal can be conveyed as a broadcast, cell-specific, or UE-specific indication. In another implementation, the transmitter/receiver 122 can transmit an implicit signal to the mobile device 102. The implicit signal can be based on a time location and a frequency location of a reference signal. In an alternative implementation, the transmitter/receiver 122 can transmit an implicit signal to the mobile device. The implicit signal can be based on a discovery reference signal periodicity adaptation of the first network device 104. Further to this example, a first time periodicity of the first network device 104 can indicate a second time periodicity of the second network device 106.

When the NR synchronization frequency is not located in the center (e.g., LTE SCell is off) techniques and solutions that can reduce the complexity and system acquisition time at the UE can be supported based on assistance information from the LTE. For a LTE RRC_Connected UE, higher layer signaling (SIB/RRC signaling) can be used to point the UE to the location(s) of the NR synchronization signals that the UE should monitor.

Granularity of the indication can be relative or absolute. For the relative indication, the first network device 104 can provide a center frequency of NR plus an offset value to the location of the synchronization signals. In an example, the frequency-domain granularity of the offset value may be at the level of subcarrier, PRB, or sub-band. In another example, the time-domain granularity of the offset value may be at the level of a symbol, slot, or subframe. For the absolute indication, the first network device 104 can provide a location of synchronization (time and frequency), the UE can later be updated with the NR center frequency bandwidth if different after connecting to the NR carrier. According to some implementations, the indication can be use-case specific (e.g., Sidelink/mMTC/IAB) indication/offsets and UE-specific definition of system/synchronization bandwidth.

The first network device 104 can provide the signal using one or more signaling methods, such as explicit signaling or implicit signaling. For example, for explicit signaling, the first network device 104 can provide a new LTE SIB in case of broadcast signaling or DC MeNB RRC message in case of UE-specific signaling or a NR SIB in case of broadcast signaling or CA RRC message in case of UE-specific signaling. For implicit signaling, the first network device 104 can provide the signaling based on time/frequency location of a given reference signal (e.g., LTE sync signal location) or indication of presence of LTE sync signals or if timing can be used from a primary carrier. In some implementations, the implicit signaling by the first network device 104 can also be based on detection of the LTE DRS periodicity adaptation (e.g., 20→40→80→20 ms indicates the corresponding NR sync resource pattern) or used for NR on unlicensed spectrum coexisting with LAA.

According to some implementations, the configuration can also be provided in the handover message for inter-frequency handover between LTE and NR. The handover message can be provided for LTE-assisted (e.g., non-standalone NR) or for standalone NR according to the various aspects provided herein.

Based on the received information, a connection can be established between the mobile device 102 and a radio resource control of the wireless network. The radio resource control connection can include LTE/NR measurement configuration. In an example, the data indicative of the location of the second timing synchronization signal transmitted to the mobile device 102 can comprise a time location and a frequency location of the second timing synchronization signal. Further to this example, the transmitter/receiver 122 can transmit a center frequency bandwidth of the second network device 106 based on a determination that the center frequency bandwidth changed after establishment of a connection between the mobile device 102 and the second network device 106.

Further, at about the same time as the mobile device 102 determines the location of the second timing synchronization signal based on the data indicative of the location of the second timing synchronization signal, the second network device 106 can transmit, to the mobile device 102, the second timing synchronization signal and second acquisition information of the second network device 106. According to some implementations, measurements reports can be transmitted to the first network device 104 and/or the second network device 106.

The respective memories 108, 114, 118 can store respective protocols associated with new radio initial access and mobility, taking action to control communication between the mobile device 102, the first network device 104, and/or the second network device 106, such that the wireless communications system 100 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 110, 116, 120 can facilitate respective analysis of information related to new radio initial access and mobility in a communication network. The processors 110, 116, 120 can be processors dedicated to analyzing and/or generating information received, a processor that controls one or more components of the wireless communications system 100, and/or a processor that both analyzes and generates information received and controls one or more components of the wireless communications system 100.

Figure 8:
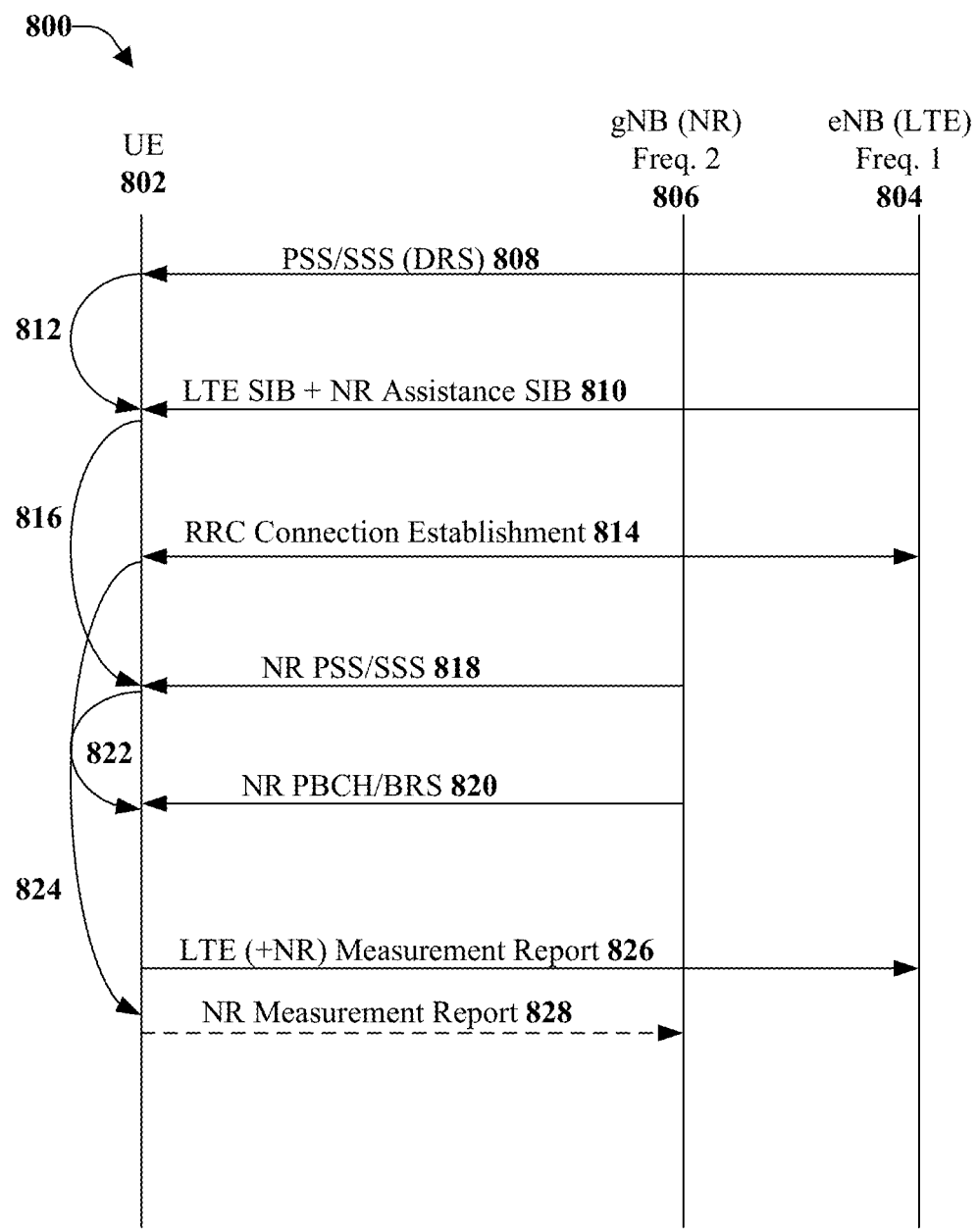
FIG. 8 illustrates a flow diagram of an example, non-limiting computer-implemented method for long term evolution assisted initial access procedures for explicit signaling in accordance with one or more embodiments described herein.

FIG. 8 illustrates a flow diagram of an example, non-limiting computer-implemented method 800 for LTE-assisted initial access procedures for explicit signaling in accordance with one or more embodiments described herein. Illustrated are a UE 802, a first network device 804 (e.g., an eNB (LTE) Freq. 1), and a second network device 806 (e.g., a gNB (NR) Freq. 2).

At 808, the first network device 804 transmits synchronization signals to the UE 802. The synchronization signals can include PSS/SSS (DRS). The first network device 804 can transmit to the UE 802, at 810 LTE SIB and NR assistance SIB. Thus, at 812, the UE 802 performs LTE timing synchronization and system information acquisition.

The UE 802 and the first network device 804 can communicate to facilitate RRC connection establishment, at 814. The communication can include LTE/NR measurement configuration. As illustrated, the UE 802 can obtain, at 816, NR synchronization location and offset.

The second network device 806, at 818, can transmit to the UE 802 synchronization signals, such as NR PSS/SSS. Further, the second network device 806 can transmit to the UE 802 NR PBCH/BRS, at 820. Thus, at 822, the UE 802 can perform NR timing synchronization and system information acquisition.

At illustrated, at 824, the UE 802 can prepare LTE and/or NR measurements and reports. Thus, at 826, the UE 802 can transmit to the first network device 804 measurement reports for both LTE and NR. Further, the UE 802, at 828, can transmit to the second network device 806, an NR measurement report.

Assistance information for NR initial access can be provided. For example, when the NR synchronization frequency is not located in the center, techniques and solutions that can reduce the complexity and system acquisition time at the UE can be supported based on assistance information from LTE.

For the LTE RRC_IDLE UE a blind sequential search should not be relied upon. Instead, techniques such as prioritized search space for the sync signal can be useful. Therefore, if the UE does not detect the signal in the center (which is the highest priority search space), the UE can look through other predetermined search spaces each with a decreasing order of priority. In this way, some planning in action is taken, the blind search algorithm for the sync signal can lead to much faster system acquisition.

Figure 9:
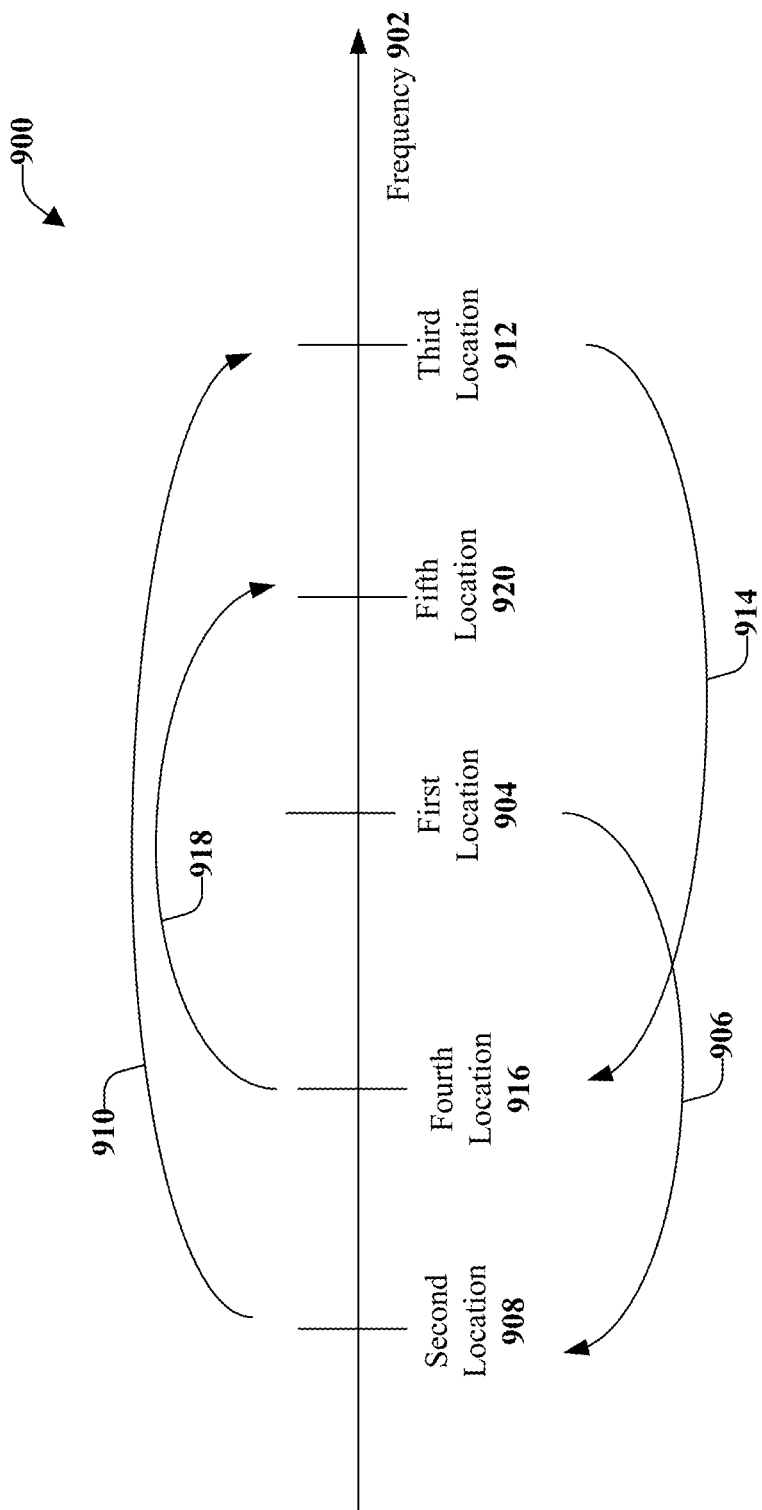
FIG. 9 illustrates an example, non-limiting long term evolution assisted synchronization search pattern that provides a center-to-edge pattern indication in accordance with one or more embodiments described herein.

For example, FIG. 9 illustrates an example, non-limiting LTE-assisted synchronization search pattern that provides a center-to-edge pattern indication 900 in accordance with one or more embodiments described herein. Frequency 902 is illustrated along the vertical axis. The UE can receive an indication to start with a first location 904 (e.g., NR SS location #1) in order to determine if NR is located on that frequency cell. If not found at the first location 904, the UE is instructed to move to an edge frequency. Therefore, the UE moves the search, indicated by arrow 906, to a second location 908 (e.g., NR SS location #2), which can be located at a first edge of the frequency. If NR is not discovered at the second location 908, according to the instructions received, UE next moves the search, indicated by arrow 910, and searches a third location 912 (e.g., NR SS location #3), which can be located at a second edge of the frequency 902. If NR is not found at the third location 912, the UE can move the search area, as indicated by arrow 914, to a fourth location 916 (e.g., NR SS location #4) according to the instructions received. Further, if NR is not found at the fourth location, the UE can move the search, indicated by arrow 918, to a fifth location 920 (e.g., NR SS location #5). Although five locations are shown and described, in various implementations fewer or more search locations can be utilized.

According to some implementations, for the LTE RRC_IDLE UE, pattern/priority for IDLE search can be provided by SIB or RRC when UE is connected and stored for future searches (single location is a special case of the pattern with only 1 location) the size of the pattern would be network specific (e.g., 1, 2, or 4 etc. values). According to another implementation, the UE can use pre-computed (e.g., from prior searches) information to reduce search space. As an example pattern: start from center and search locations based on offsets of the BW/2 of the sync signal+X/2 where X is configurable by the network or a function of the carrier Band Width (BW).

Figure 10:
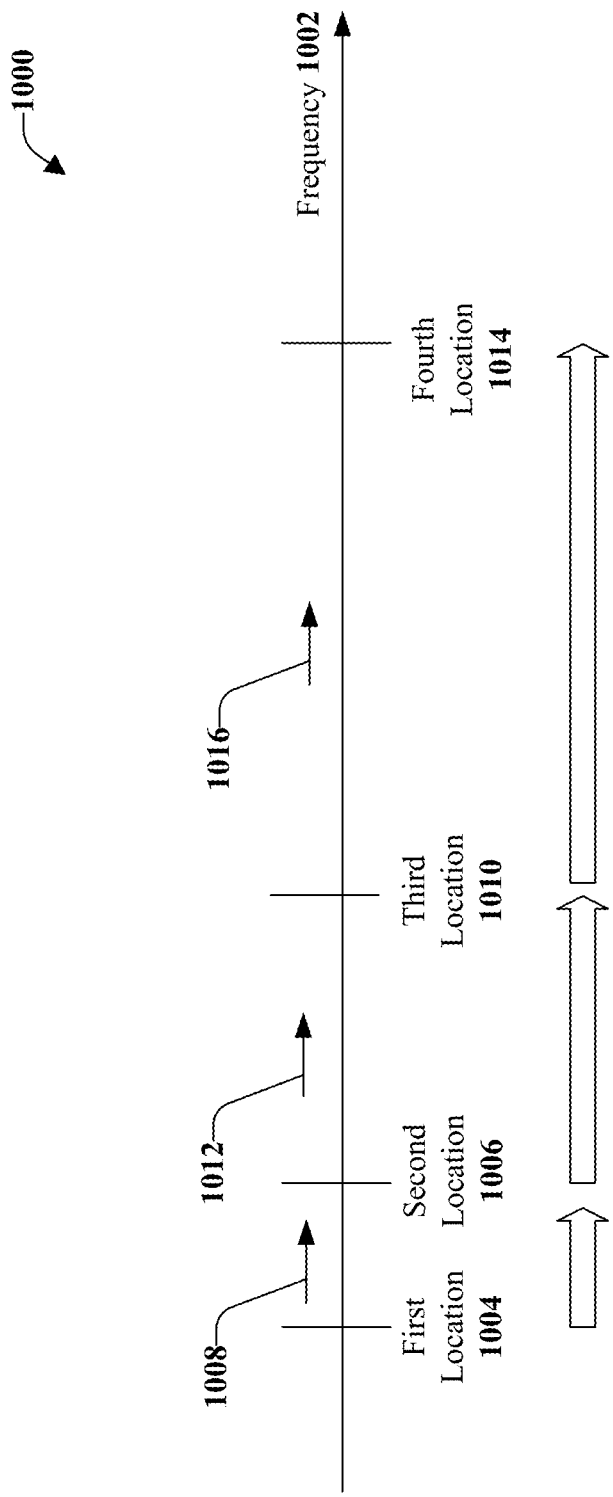
FIG. 10 illustrates an example, non-limiting long term evolution assisted synchronization search pattern that provides a bandwidth plus increment pattern in accordance with one or more embodiments described herein.

For example, FIG. 10 illustrates an example, non-limiting LTE-assisted synchronization search pattern that provides a bandwidth plus increment pattern 1000 in accordance with one or more embodiments described herein. Frequency 1002 is illustrated along the vertical axis. The UE can begin the search at a first location 1004 (e.g., NR SS location #1). If the NR signal is not found, the UE can move the search to a second location 1006 (e.g., NR SS location #2). The amount of movement 1008 between the first location 1004 and the second location 1006 can be determined, for example, by the equation (BW+X)/2, as discussed above. If the NR signal is not found at the second location 1006, the UE can move the search to a third location 1010 (e.g., NR SS location #3). The amount of movement 1012 between the second location 1006 and the third location 1010 can be determined based on the equation (BW+X), for example. Further, if the NR signal is not found at the third location 1010, the UE can search a fourth location 1014 and the position of the fourth location 1014 (e.g., the amount to move 1016) can be determined by the equation 2(BW+X), for example.

In some implementations, a UE may follow a two-stage process (first attempt to detect locations based on the prioritized sweep and if that fails, fall back on worst case blind search). It is noted that the above can also apply in the case of RRC_CONNECTED UEs. According to a hybrid approach, a UE can maintain a very lightweight connection to LTE (e.g., RRC_CONNECTED with long DRX) to get assistance info for NR IDLE mode search.

Figure 11:
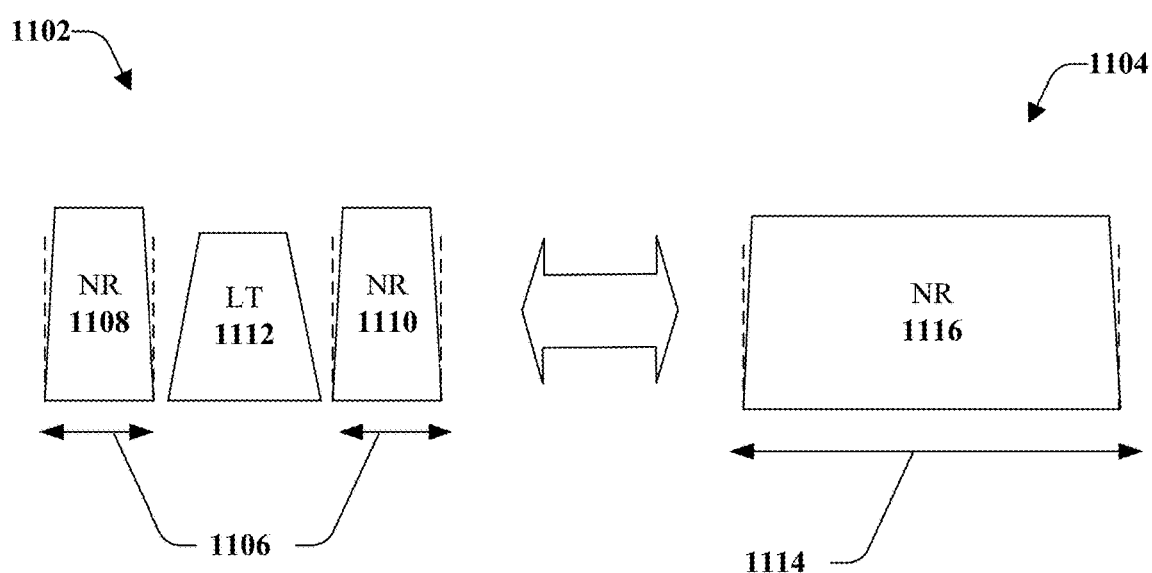
FIG. 11 illustrates an example, non-limiting new radio synchronization signal design for long term evolution configured new radio resource management measurement bandwidth in accordance with one or more embodiments described herein.

FIG. 11 illustrates an example, non-limiting new radio synchronization signal design for LTE-configured NR RRM measurement bandwidth in accordance with one or more embodiments described herein. Illustrated at 1102 is a pattern when LTE is active; at 1104 is a pattern when LTE is not active.

In order to dynamically turn on/off part of the NR carrier, the system bandwidth should be capable of being reconfigurable, which should also apply to the measurement bandwidth used by the UE. In order to ensure that measurements are not performed over the part of the NR carrier that is turned off, semi-static (e.g., RRC configured) signaling or L signaling on the LTE carrier could be utilized for example via a measurement restriction indication. In another example, the signaling could be implementation based (e.g., network discards invalid subband measurements). In a further example, the signaling could be an indication of the coefficients used for L3 RRM measurement filtering.

According to an implementation, the measurement restriction indication can include time slot or frequency subband patterns and/or number of ports in case of multi-antenna RRM. Further to this implementation, patterns can be configured semi-statically and a UE can be indicated to switch between the patterns using higher layer or dynamic L1 signaling. In another example, default pattern and restricted pattern can be switched at the UE based on implicit detection of a signal (e.g., LTE or NR sync signal).

As illustrated in FIG. 11, a first measurement bandwidth pattern 1106 is indicated at the NR transmissions 1108, 1110 (where the PRB 1112 is a center location). Also illustrated is a second measurement bandwidth pattern 1114 that comprises a NR transmission 1116. Further, the pattern configuration can be indicated by LTE-assistance information.

According to some implementations, LTE-triggered NR measurement can be provided. Aperiodic NR RRM measurements (UE-specific) could also be used for this purpose and can be supported as part of LTE-assisted NR initial access/mobility. For example, configuration of NR time/frequency resources and measurement reports via LTE (RRC) which are independent of those configured for LTE can be provided. Further, on-demand report triggering (higher layer or physical layer signaling) can be provided. In addition, sending NR report on LTE (as part of a new RRM measurement report format) can be provided in accordance with the various aspects provided herein.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 12:
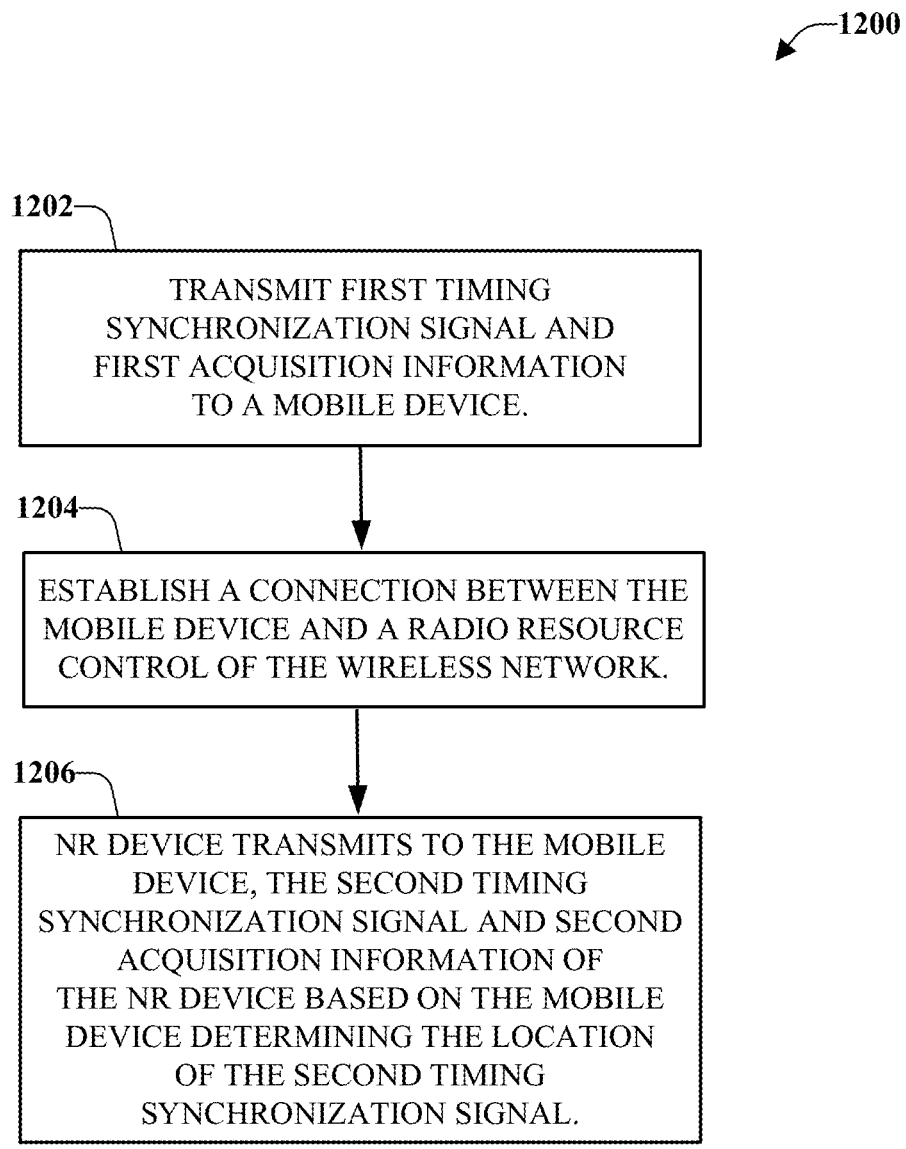
FIG. 12 illustrates a flow diagram of an example, non-limiting computer-implemented method for initial access and mobility in accordance with one or more embodiments described herein.

FIG. 12 illustrates an example, non-limiting method 1200 for initial access and mobility in accordance with one or more embodiments described herein. The method 1200 starts at 1202 when a first timing synchronization signal and first acquisition information are transmitted to a mobile device. The first timing synchronization signal and the first acquisition information can be transmitted by a LTE device. Further, the first acquisition information can comprise data indicative of a location of a second timing synchronization signal of a NR device of the wireless network.

In response to transmitting the first timing synchronization signal and the first acquisition information and based on a transmission received from the mobile device, at 1204, a connection between the mobile device and a radio resource control of the wireless network is established. Further, at 1206, in response to the mobile device determining the location of the second timing synchronization signal based on the data indicative of the location of the second timing synchronization signal, the NR device can transmit, to the mobile device, the second timing synchronization signal and second acquisition information of the NR device.

According to an implementation, the data indicative of the location of the second timing synchronization signal transmitted, at 1202, can comprise a time location and a frequency location of the second timing synchronization signal. Further to this implementation, the LTE device can transmit a center frequency bandwidth of the NR device based on a determination that the center frequency bandwidth changed after establishment of the connection between the mobile device and the second network device.

According to another implementation, the data indicative of the location of the second timing synchronization signal transmitted, at 1202, can comprise another location of a center frequency of the second network device and an offset value. Further to this implementation, the offset value can be based on bandwidth availability for the second timing synchronization signal.

In some aspects, transmitting the first timing synchronization signal and the first acquisition information, at 1202, can include transmitting an explicit signal to the mobile device. The explicit signal can comprise the data indicative of the location of the second timing synchronization signal and can be included in the first acquisition information.

In an alternative aspect, transmitting the first timing synchronization signal and the first acquisition information, at 1202, can include transmitting an implicit signal to the mobile device. The implicit signal can be based on a time location and a frequency location of a reference signal. In another aspect, transmitting the first timing synchronization signal and the first acquisition information, at 1202, can include transmitting an implicit signal to the mobile device. The implicit signal can be based on a discovery reference signal periodicity adaptation of the first network device. Further to this aspect, a first time periodicity of the LTE device can indicate a second time periodicity of the NR device.

Figure 13:
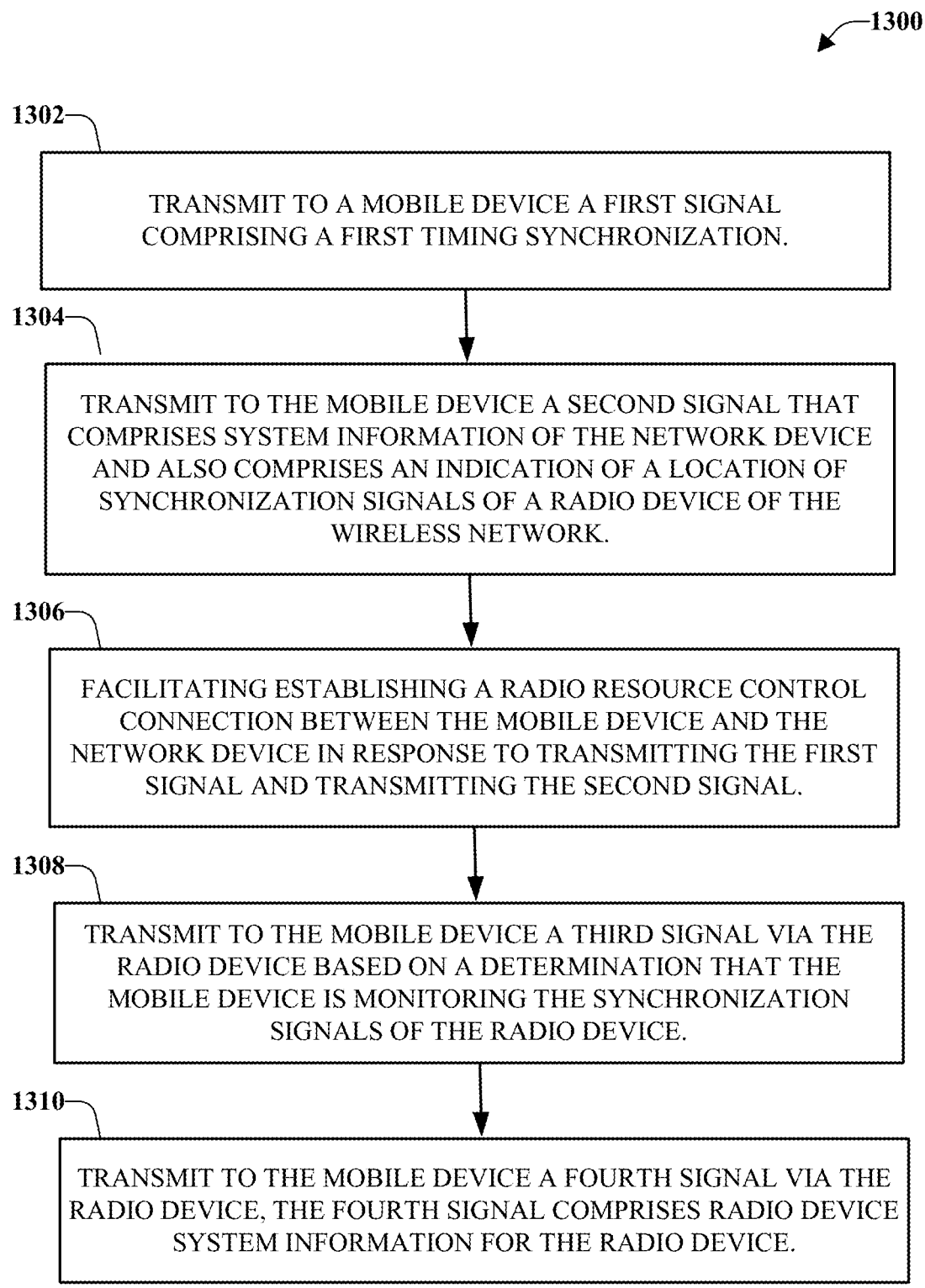
FIG. 13 illustrates a flow diagram of an example, non-limiting computer-implemented method for providing assistance for new radio initial access and mobility in accordance with one or more embodiments described herein.

FIG. 13 illustrates an example, non-limiting method 1300 for providing assistance for NR initial access and mobility in accordance with one or more embodiments described herein. At 1302, a first signal is transmitted to a mobile device via a network device of a group of network devices of a wireless network. The first signal can comprise a first timing synchronization of the network device.

Further, at 1304, a second signal can be transmitted to the mobile device via the network device. The second signal can comprise system information of the network device. Further, the second signal can comprise an indication of a location of synchronization signals of a radio device of the wireless network. According to an implementation, transmitting the second signal can comprise transmitting a location of a center frequency of the radio device and an offset value relative to the center frequency. Further to this implementation, the offset value can be selected based on a bandwidth availability of the synchronization signals of the radio device. According to another implementation, transmitting the second signal can comprise transmitting an implicit signal to the mobile device. The implicit signal can be based on a discovery reference signal periodicity adaptation of the network device. Further, a time periodicity of the network device can refer to another time periodicity of the radio device.

The method 1300 continues at 1306 when a radio resource control connection is established between the mobile device and the network device in response to transmitting the first signal and transmitting the second signal. The mobile device can utilize the radio resource control connection for control signaling and the radio device for data transmission.

At 1308, a third signal can be transmitted to the mobile device via the radio device based on a determination that the mobile device is monitoring the synchronization signals of the radio device. The third signal can comprise a second timing synchronization of the radio device. For example, the mobile device can search for the location of the synchronization signals based on the information received, and therefore, can monitor the synchronization signals of the radio device. Further, at 1310, a fourth signal can be transmitted to the mobile device via the radio device. The fourth signal can comprise radio device system information for the radio device.

Figure 14:
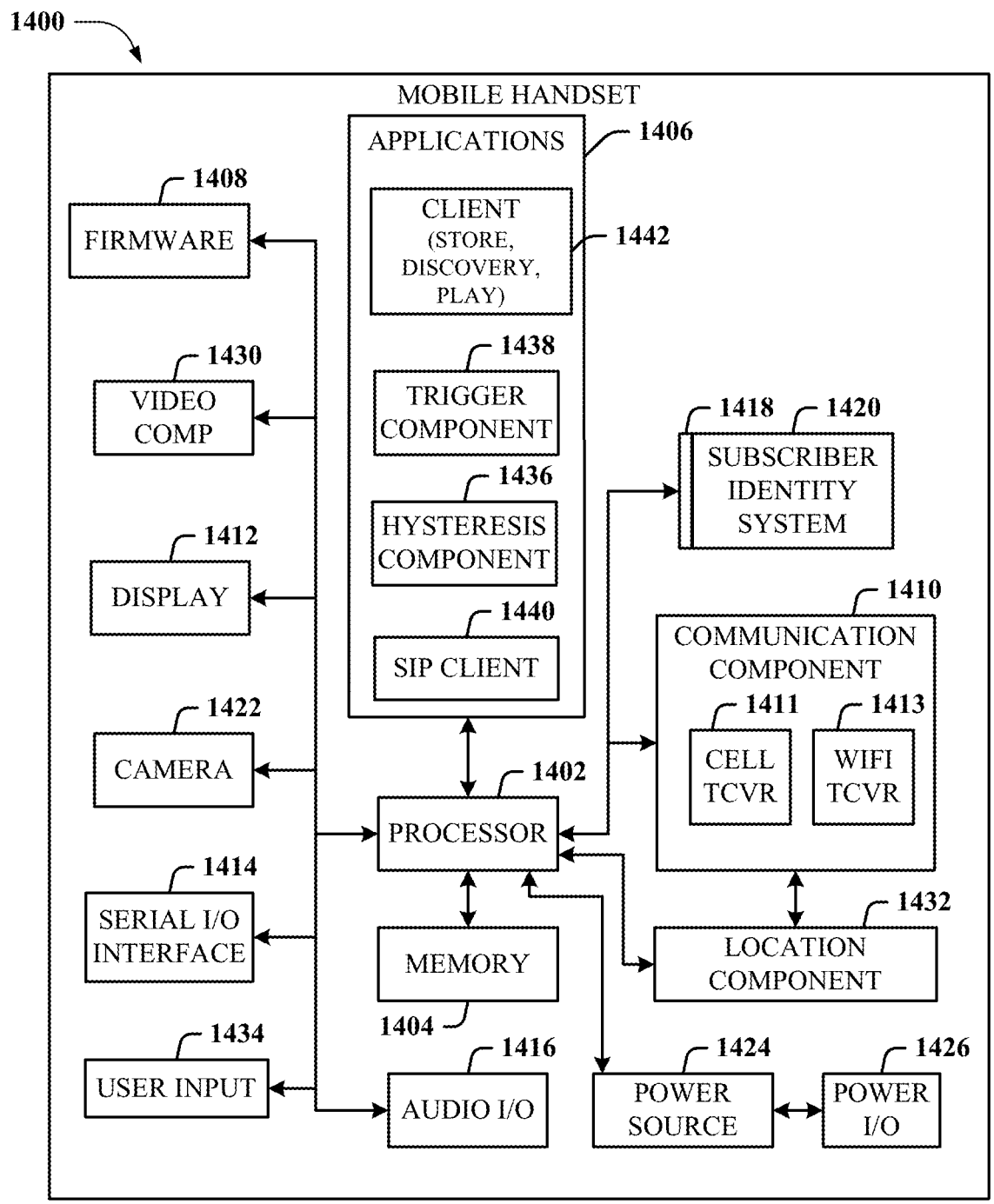
FIG. 14 illustrates an example block diagram of an example mobile handset operable to engage in a system architecture that facilitates secure wireless communication according to one or more embodiments described herein.

Referring now to FIG. 14, illustrated is a schematic block diagram of an exemplary end-user device such as a mobile device or handset 1400 capable of connecting to a network in accordance with some embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
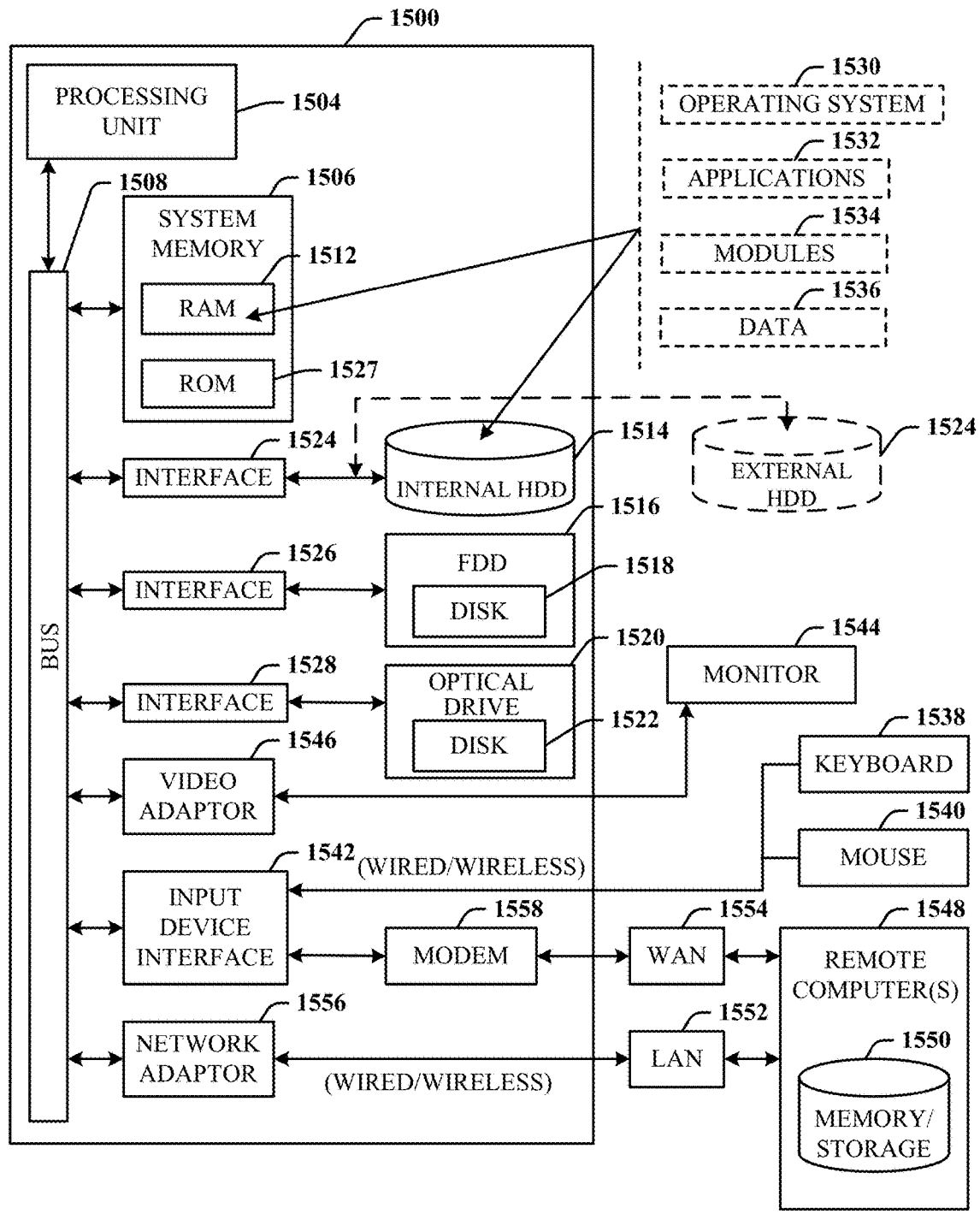
FIG. 15 illustrates an example block diagram of an example computer operable to engage in a system architecture that facilitates secure wireless communication according to one or more embodiments described herein.

Referring now to FIG. 15, there is illustrated a block diagram of a computer 1500 operable to execute a system architecture that facilitates establishing a transaction between an entity and a third party. The computer 1500 can provide networking and communication capabilities between a wired or wireless communication network and a server (e.g., Microsoft server) and/or communication device. In order to provide additional context for various aspects thereof, FIG. 15 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 15, implementing various aspects described herein with regards to the end-user device can include a computer 1500, the computer 1500 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1527 and random access memory (RAM) 1512. A basic input/output system (BIOS) is stored in a non-volatile memory 1527 such as ROM, EPROM, EEPROM, which BIOS contains the basic routines that help to transfer information between elements within the computer 1500, such as during start-up. The RAM 1512 can also include a high-speed RAM such as static RAM for caching data.

The computer 1500 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1500 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1500, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1500 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 through an interface, such as a video adapter 1546. In addition to the monitor 1544, a computer 1500 typically includes other peripheral output devices (not shown), such as speakers, printers, etc.

The computer 1500 can operate in a networked environment using logical connections by wired and/or wireless communications to one or more remote computers, such as a remote computer(s) 1548. The remote computer(s) 1548 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1500 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1500 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the input device interface 1542. In a networked environment, program modules depicted relative to the computer, or portions thereof, can be stored in the remote memory/storage device 1550. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a first network device of a wireless network and comprising a processor, first data indicative of a first location of a first timing synchronization signal of a second network device of the wireless network based on a status of the first network device, the determining comprising:
   facilitating collision avoidance between the first location of the first timing synchronization signal and at least a second location of a second timing synchronization signal of the first network device based on the status being an active status, and
   occupying at least the second location with the first timing synchronization signal based on the status being an inactive status;
   transmitting, by the first network device, the second timing synchronization signal and first acquisition information of the first network device to a mobile device, wherein the first acquisition information comprises the first data indicative of the first location of the first timing synchronization signal, wherein the first timing synchronization signal and the second timing synchronization signal coexist on a single frequency band;
   in response to the transmitting of the second timing synchronization signal and the first acquisition information and based on a transmission received from the mobile device, facilitating, by the first network device, a connection between the mobile device and a radio resource control of the wireless network; and
   in response to the mobile device determining the first location of the first timing synchronization signal based on the first data indicative of the first location of the first timing synchronization signal, instructing the second network device to transmit, to the mobile device, the first timing synchronization signal and second acquisition information of the second network device, wherein the first network device is associated with a first radio access technology and the second network device is associated with a second radio access technology different from the first radio access technology.

2. The method of claim 1, wherein the first data indicative of the first location of the first timing synchronization signal comprises a time location and a frequency location of the first timing synchronization signal.

3. The method of claim 2, further comprising transmitting, by the first network device, a center frequency bandwidth of the second network device based on a determination that the center frequency bandwidth changed after establishment of the connection between the mobile device and the second network device.

4. The method of claim 1, wherein the first data indicative of the first location of the first timing synchronization signal comprises second data indicative of a third location of a center frequency of the second network device and an offset value.

5. The method of claim 4, wherein the offset value is based on a bandwidth availability for the second timing synchronization signal.

6. The method of claim 1, wherein the transmitting the second timing synchronization signal and the first acquisition information comprises transmitting an explicit signal to the mobile device, and wherein the explicit signal comprises the first data indicative of the first location of the first timing synchronization signal and is included in the first acquisition information.

7. The method of claim 1, wherein the transmitting the second timing synchronization signal and the first acquisition information comprises transmitting an implicit signal to the mobile device, and wherein the implicit signal is based on a time location and a frequency location of a reference signal.

8. The method of claim 1, wherein the transmitting the second timing synchronization signal and the first acquisition information comprises transmitting an implicit signal to the mobile device, and wherein the implicit signal is based on a discovery reference signal periodicity adaptation of the first network device.

9. The method of claim 8, wherein a first time periodicity of the first network device indicates a second time periodicity of the second network device.

10. The method of claim 1, wherein the mobile device is in a connected mode with the wireless network.

11. The method of claim 1, wherein the second network device is a radio device of the wireless network.

12. A system, comprising:
a processor; and
a memory that stores executable instructions that, when executed by the processor, facilitate performance of operations, comprising:
selecting a first location of synchronization signals of a radio device of a wireless network based on a status of a network device, the selecting comprising:
avoiding a second location of a first timing synchronization of the network device based on the status being an active status, and
occupying the second location with the synchronization signals of the radio device based on the status being an inactive status, wherein the network device is included in a group of network devices of the wireless network;
transmitting, to a mobile device via the network device, a first signal that comprises the first timing synchronization of the network device;
transmitting, to the mobile device via the network device, a second signal that comprises system information of the network device and an indication of the first location of the synchronization signals wherein the first signal and the second signal are transmitted according to a same frequency band;
facilitating establishing a radio resource control connection between the mobile device and the network device in response to the transmitting the first signal and the transmitting the second signal;
transmitting a third signal to the mobile device via the radio device based on a determination that the mobile device is monitoring the synchronization signals of the radio device, wherein the third signal comprises a second timing synchronization of the radio device; and
transmitting a fourth signal to the mobile device via the radio device, wherein the fourth signal comprises radio device system information for the radio device.

13. The system of claim 12, wherein the mobile device utilizes the radio resource control connection for control signaling and the radio device for data transmission.

14. The system of claim 12, wherein the transmitting the second signal comprises transmitting data indicative of a third location of a center frequency of the radio device and an offset value relative to the center frequency.

15. The system of claim 14, wherein the offset value is selected based on a bandwidth availability of the synchronization signals of the radio device.

16. The system of claim 12, wherein the transmitting the second signal comprises transmitting an implicit signal to the mobile device, wherein the implicit signal is based on a discovery reference signal periodicity adaptation of the network device, and wherein a time periodicity of the network device refers to another time periodicity of the radio device.

17. A non-transitory machine-readable storage medium, comprising executable instructions that, when executed by a processor, facilitate performance of operations, comprising:
determining a status of a network device of network devices of a wireless network, wherein the status is one from a group comprising an active status and an inactive status;
selecting a first location of synchronization signals of a radio device, the selecting comprising:
avoiding a second location of a first signal based on the status being the active status, and
occupying the second location with the synchronization signals of the radio device based on the status being the inactive status;
sending, to a mobile device via the network device a first signal that comprises first timing synchronization information of the network device;
sending, to the mobile device via the network device, a second signal that comprises an instruction related to a first location of synchronization signals of the radio device, wherein the first signal and the second signal are on a same frequency band;
facilitating establishing a radio resource control connection between the mobile device and the network device in response to the sending the first signal and the sending the second signal;
facilitating sending a third signal to the mobile device via the radio device by the network device, wherein the third signal comprises second timing synchronization information of the radio device; and
facilitating sending a fourth signal to the mobile device via the radio device by the network device, wherein the fourth signal comprises system acquisition information of the radio device.

18. The non-transitory machine-readable storage medium of claim 17, wherein the instructions comprise data indicative of a center frequency of the radio device and an offset value relative to the center frequency, and wherein the offset value is selected based on an available bandwidth of synchronization signals of the radio device.

19. The non-transitory machine-readable storage medium of claim 17, wherein the network device operates within a first radio access technology and the radio device operates within a second radio access technology different from the first radio access technology, and wherein the instruction comprises a center-to-edge pattern search based on a determination that the first radio access technology is active within the wireless network.

20. The non-transitory machine-readable storage medium of claim 17, wherein the mobile device utilizes the radio resource control connection for control signaling and the radio device for data transmission.

* * * * *